(12) United States Patent
Fang et al.

(10) Patent No.: US 11,662,282 B2
(45) Date of Patent: May 30, 2023

(54) HIGH-TEMPERATURE IN-SITU LOADED COMPUTED TOMOGRAPHY TESTING SYSTEM BASED ON LABORATORY X-RAY SOURCE AND METHOD THEREFOR

(71) Applicant: Beijing Institute of Technology, Beijing (CN)

(72) Inventors: Daining Fang, Beijing (CN); Zhaoliang Qu, Beijing (CN); Rongqi Zhu, Beijing (CN); Shuo Yang, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 56 days.

(21) Appl. No.: 17/385,206

(22) Filed: Jul. 26, 2021

(65) Prior Publication Data
US 2022/0074835 A1   Mar. 10, 2022

(30) Foreign Application Priority Data

Sep. 4, 2020   (CN) .......................... 202010919262.3

(51) Int. Cl.
*G01N 3/06* (2006.01)
*G01N 3/18* (2006.01)

(52) U.S. Cl.
CPC .............. *G01N 3/06* (2013.01); *G01N 3/18* (2013.01); *G01N 2203/0016* (2013.01); *G01N 2203/0647* (2013.01)

(58) Field of Classification Search
CPC .... G01N 3/06; G01N 3/18; G01N 2203/0016; G01N 2203/0647; G01N 2203/0017;
(Continued)

(56) References Cited

U.S. PATENT DOCUMENTS

2018/0180521 A1* 6/2018 Zhao .................. G01N 3/18

FOREIGN PATENT DOCUMENTS

| CN | 106124336 A | * 11/2016 | ............. G01N 3/068 |
| CN | 107389468 A | * 11/2017 | ............. G01N 3/06 |

(Continued)

*Primary Examiner* — Marrit Eyassu
(74) *Attorney, Agent, or Firm* — Nolte Lackenbach Siegel

(57) ABSTRACT

A high-temperature in-situ loaded computed tomography (CT) testing system based on a laboratory X-ray source and a method therefor are provided. A dynamic sealing device is adopted. A pull-up pressure rod and a pull-down pressure rod are allowed to rotate circumferentially and move axially. Meanwhile, a high-temperature furnace is fixed without rotating or moving, such that the high-temperature furnace is flat in an imaging direction to shorten an imaging distance and improve imaging quality. An independent tensile testing machine is utilized to achieve high-load loading. The in-situ measurement of internal deformation and damage information of a specimen under tensile or compressive load in a high-temperature environment is implemented. By taking advantage of the miniaturization design of the high-temperature device, the accuracy of the damage test using the laboratory X-ray source is increased. Tests and researches on the internal damage and failure behavior of the high-temperature materials can be conducted.

9 Claims, 3 Drawing Sheets

(58) Field of Classification Search
CPC ... G01N 2203/0067; G01N 2203/0226; G01N 2203/0641; G01N 2203/0676; G01N 2203/0694; G01N 23/046; G01N 3/068; G01N 2223/03; G01N 2223/1016; G01N 2223/20
USPC .......................................................... 73/774
See application file for complete search history.

(56) References Cited

FOREIGN PATENT DOCUMENTS

| | | | | | |
|---|---|---|---|---|---|
| CN | 107677545 | A | * | 2/2018 | ............... G01N 3/06 |
| CN | 107703003 | A | * | 2/2018 | |
| CN | 110715862 | A | * | 1/2020 | |
| CN | 111060406 | A | * | 4/2020 | |
| CN | 111122344 | A | * | 5/2020 | |

* cited by examiner

HIGH-TEMPERATURE IN-SITU LOADED COMPUTED TOMOGRAPHY TESTING SYSTEM BASED ON LABORATORY X-RAY SOURCE AND METHOD THEREFOR

CROSS REFERENCE TO RELATED APPLICATION(S)

This patent application claims the benefit and priority of Chinese Patent Application No. 202010919262.3 filed on Sep. 4, 2020, the disclosure of which is incorporated by reference herein in its entirety as part of the present application.

TECHNICAL FIELD

The present disclosure relates to a high-temperature mechanical testing technology, and in particular, to a high-temperature in-situ loaded computed tomography (CT) testing system based on a laboratory X-ray source, and a testing method therefor.

BACKGROUND ART

Service environments featured by high temperature and ablation are most commonly found in the area of aerospace. The temperature at the turbine inlet of the aero engine, which is known as the crown jewel of modern industry, is as high as 1,700° C., and the temperature of parts such as nose cone and leading edge of the wing of the supersonic aircraft even exceeds 2,200° C. during high-speed flight. Therefore, the use of high-temperature materials is critical to the development of aerospace equipment. The research on the damage and failure mechanism of high-temperature materials is important for further improvement and design of the structure and performance of the materials. High-temperature materials, such as C/SiC ceramic matrix composites, C/C ceramic matrix composites and SiC/SiC ceramic matrix composites, have complex and diverse structures, are used in harsh service environments, and may be subjected to diverse damage modes. It is difficult to acquire sufficient information to analyze the damage and failure mechanism of the materials by only relying on some ex-situ and exterior observation means. Therefore, it is of great significance to develop a testing system for in-situ and interior observation of materials.

Detection methods for internal damage of materials include contact detection methods, non-contact detection methods, and optical observation methods, for example. The contact detection methods, such as magnetic particle method, ultrasonic method, seepage method and vibration method, are restricted by high-temperature conditions and are hard to implement during loading due to the limitation of the working temperature of measuring equipment. As for non-contact detection methods, such as infrared thermal imaging method, magnetic eddy current method and microwave method, on one hand, the high-temperature heat radiation will affect the accuracy of information acquisition, and on the other hand, these detection methods suffer from poor applicability to some composites with complex structures. The optical observation method can only acquire information on the surface of the material, and cannot detect the inside of the material during loading.

With the evolution of physics and computer technology, Computed Tomography (CT) technology is greatly improved in terms of imaging accuracy and speed, and it has become increasingly popular in the area of in-situ observation for internal damage of materials. X-ray sources are classified into synchrotron ray sources and micro-focus ray sources (i.e., laboratory ray sources) according to the form of ray emission. At present, the ray sources commonly used for high-temperature in-situ loaded CT testing are mostly the synchrotron ray sources. The large-scale synchrotron ray sources exhibit better performance in imaging accuracy, scanning speed, etc. However, the in-situ loaded CT equipment based on synchrotron ray sources is complicated to construct, high in price and experiment costs, and poor in specificity, making it hard to be popularized in laboratories. Laboratory ray sources are limited by the shape of the ray cone beam and the ray energy, and have disadvantages such as long CT scan duration, poor imaging accuracy at long distances, low Signal-to-Noise Ratio (SNR) and insufficient stability. All of these are the key factors that restrict the use of laboratory ray sources in the high-temperature in-situ testing. In view of this, it is of great significance to overcome these challenges and adopt the more common laboratory X-ray source to develop a testing system that is capable of observing the internal damage behaviors of the materials loaded in a high-temperature environment.

SUMMARY

In order to solve the above problems existing in the prior art, the present disclosure proposes a high-temperature in-situ loaded computed tomography (CT) testing system based on a laboratory X-ray source and a testing method therefor. The present disclosure makes a breakthrough in the miniaturization design of a high-temperature device, and achieves the high-accuracy CT imaging of a cone-beam X-ray source/detector at a long distance. With the miniaturization design of the high-temperature device, the imaging distance (the imaging distance between the detector and the ray source is 100-300 mm) is shortened, the accuracy of CT imaging is improved, and imaging noise is reduced. According to the present disclosure, a more widely applicable radiant heating method is employed, and a loading device and a heating device are separated from each other. A large-scale loading device may be incorporated to achieve a high load of up to 100 kN. The present disclosure achieves the in-situ observations and quantitative studies on the internal damage and deformation behaviors of the high-temperature material when the high-temperature material is subjected to tensile and compressive loads in the environment that is close to actual service.

An object of the present disclosure is to propose a high-temperature in-situ loaded CT testing system based on a laboratory X-ray source.

A tensile testing machine includes a standing post, a lead screw, an upper movable beam, a lower fixed beam, a transmission structure, a pull-up platform and a pull-down platform; the standing post and the lead screw are disposed in a vertical direction; upper and lower ends of the standing post are respectively connected with an upper movable beam and a lower movable beam that are disposed in a horizontal direction; the upper movable beam is connected with the lead screw through the transmission structure, and moves up and down as the lead screw rotates; the upper movable beam and the lower movable beam are respectively provided thereon with the pull-up platform and the pull-down platform that are disposed in the horizontal direction.

The high-temperature in-situ loaded CT testing system based on a laboratory X-ray source according to the present disclosure includes the tensile testing machine, a pull-up pressure rod, a pull-down pressure rod, a high-temperature furnace support, a high-temperature furnace, a circulation water cooling device, a dynamic sealing device, an upper fixture, a lower fixture, an incident window, a transmission window, a ray source, a detector, a first movable device, a second movable device, a temperature sensor, a rotating motor, a temperature control panel and a console; wherein, a furnace body of the high-temperature furnace is flat along an imaging direction; a front sealing cover plate and a rear sealing cover plate that are parallel to each other and perpendicular to the imaging direction are respectively provided in the front and rear of the furnace body along the imaging direction; a ray source window and a detection window facing each other are provided in respective centers of the front sealing cover plate and the rear sealing cover plate; one end of a vacuum tube is communicated with inside of the high-temperature furnace through the front sealing cover plate of the high-temperature furnace, and another end of the vacuum tube is connected to a vacuum pump for vacuum pumping, or a specified gas is directly injected into the high-temperature furnace; two through holes are respectively provided at top and bottom ends of the furnace body of the high-temperature furnace, and the dynamic sealing device is disposed in the through hole; a plurality of radiant heating sources that are symmetric with respect to the imaging direction are provided in the high-temperature furnace, and are connected to the temperature control panel located outside the high-temperature furnace; a lower surface of the pull-up platform and an upper surface of the pull-down platform of the tensile testing machine are respectively provided with the pull-up pressure rod and the pull-down pressure rod that are coaxially disposed in the vertical direction; the high-temperature furnace support is attached to the standing post of the tensile testing machine and between the pull-up platform and the pull-down platform; the high-temperature furnace is fixedly mounted on the high-temperature furnace support; a bottom end of the pull-up pressure rod and a top end of the pull-down pressure rod are respectively connected with the top and bottom ends of the high-temperature furnace in a sealed manner through the dynamic sealing device and extended into the high-temperature furnace to form a sealed environment in the high-temperature furnace; the upper fixture and the lower fixture are respectively provided at the bottom end of the pull-up pressure rod and the top end of the pull-down pressure rod in the high-temperature furnace; the circulation water cooling device is provided at a wall of the high-temperature furnace; the ray source and the detector are respectively attached to the first movable device and the second movable device, and respectively face the ray source window and the detection window; the temperature sensor is provided in the high-temperature furnace, and is connected to the console located outside the high-temperature furnace through a data cable; the rotating motor is provided in the tensile testing machine to connect with the pull-up platform and the pull-down platform; the ray source, the detector, the temperature sensor, the rotating motor, the first movable device and the second movable device are respectively connected to the console; top and bottom ends of a specimen are respectively fixed in the upper fixture and the lower fixture, such that the specimen is fixed inside the high-temperature furnace; a size of a heating area is adjusted by controlling a distance between the radiant heating source and the specimen; the plurality of radiant heating sources in the high-temperature furnace focus on the specimen to heat the specimen; the temperature sensor is used to acquire a temperature of the specimen, and the temperature is adjusted to a specified heating temperature through the external temperature control panel; after the temperature is stabilized, the console controls the tensile testing machine to apply a tensile or compressive load to the specimen through the pull-up pressure rod and the pull-down pressure rod; the rotating motor drives the pull-up platform, the pull-down platform, the pull-up pressure rod, the pull-down pressure rod and the specimen to rotate synchronously; the dynamic sealing device allows the pull-up pressure rod and the pull-down pressure rod to rotate circumferentially and move axially, while the high-temperature furnace is fixed without rotating and moving; the tensile testing machine, which is independent, is used to achieve high-load loading; the ray source emits an X-ray to irradiate the specimen through the incident window; the X-ray passes through the specimen and is received by the detector through the transmission window; during imaging, the high-temperature furnace does not rotate such that the high-temperature furnace is flat in the imaging direction, which shortens an imaging distance and improves imaging quality; the detector acquires projection data from the received transmitted X-ray, and transmits the data to the console; the console reconstructs, analyzes and processes the projection data to acquire information on internal deformation and damage of the specimen loaded in the high-temperature environment.

The radiant heating source may include a halogen bulb, and the specified heating temperature is 800-1,200° C.

The circulation water cooling device includes cooling water inlets, a cooling water chamber and a cooling water outlet; the cooling water inlets are provided at two side walls of a lower part of the high-temperature furnace; the cooling water chamber is provided at a side wall of the high-temperature furnace; the cooling water outlet is provided at a side wall of an upper part of the high-temperature furnace; double ends of the cooling water chamber are respectively connected with the cooling water inlets and the cooling water outlet; the cooling water inlet and the cooling water outlet are connected with an external circulation cooling water tank; the circulation cooling water tank injects circulation cooling water into the cooling water chamber through the cooling water inlets, and the circulation cooling water flows out from the cooling water outlet. In this way, the ambient temperature surrounding the high-temperature furnace is controlled without being excessively high.

The dynamic sealing device includes a sealing gland and a sealing bushing; the sealing bushing, which is tubular, is snugly sleeved outside the pull-up pressure rod or the pull-down pressure rod; the sealing bushing coaxially connects, in a sealed manner, a space between a top wall of the high-temperature furnace and the pull-up pressure rod or between a bottom wall of the high-temperature furnace and the pull-down pressure rod; the sealing gland, which is annular, is located at a top end or a bottom end of the sealing bushing and seals an outer surface of the top or bottom wall of the high-temperature furnace. The sealing bushing is made of heat-resistant rubber, and is mated with the sealing gland to seal a space between the top wall and the bottom wall of the high-temperature furnace. The gland and the bushing do not restrict the circumferential and axial movements of the pull-up pressure rod and the pull-down pressure rod.

The first movable device and the second movable device each include a horizontal guide rail, a vertical guide rail and a mounting bracket; the vertical guide rail is provided on the horizontal guide rail; the mounting bracket is attached to the vertical guide rail; the ray source and the detector are fixed to the respective mounting bracket respectively, and are moved horizontally and vertically through the first movable device and the second movable device respectively.

Opening holes acting as mounting holes are respectively provided at aligned positions at a bottom end of the upper fixture and a top end of the lower fixture.

The temperature sensor may include a thermocouple.

The incident window and the transmission window are made of aluminum or glassy carbon.

During the test, the high-temperature furnace is fixed without rotating and moving. Therefore, the high-temperature furnace may be made into a flat shape along the imaging direction with a thickness of less than 90 mm. According to the present disclosure, the high-temperature furnace is fixed without rotating and moving during the test by using the dynamic sealing device, such that the high-temperature device and the loading device is separated from each other. During the scanning process, the objects to be rotated are changed from the high-temperature device, the loading device and the specimen to only the loading device and the specimen. This enables the flat design of the high-temperature furnace in the imaging direction so as to shorten the imaging distance and improve the imaging resolution of the laboratory ray source. In the existing CT high-temperature in-situ loaded system with integrated loading and heating devices, the high-temperature device, the loading device and the specimen are required to be rotated together during the scanning process. The influence of shielding from the high-temperature furnace needs to be considered for CT imaging, and therefore shielding conditions in all directions are required to keep consistent. In this case, the flat design of the high-temperature furnace is not applicable, and it needs to be designed in a cylindrical shape. However, the cylindrical high-temperature furnace will increase the imaging distance. The impact of the increased imaging distance on the imaging resolution is small for a synchrotron ray source with higher energy, but it cannot be ignored for the laboratory ray source with lower energy. In order to solve this problem of imaging with the laboratory ray source, the high-temperature furnace may only be flattened by changing the rotating structure to shorten the imaging distance and improve imaging accuracy.

Another object of the present disclosure is to propose a high-temperature in-situ loaded CT testing method based on a laboratory X-ray source.

The high-temperature in-situ loaded CT testing method based on a laboratory X-ray source according to the present disclosure includes the following steps:

1) constructing a device:

mounting the pull-up pressure rod and the pull-down pressure rod coaxially on the lower surface of the pull-up platform and the upper surface of the pull-down platform of the tensile testing machine in the vertical direction, respectively; providing the high-temperature furnace support horizontally on the standing post of the tensile testing machine and between the pull-up platform and the pull-down platform; fixedly mounting the high-temperature furnace on the high-temperature furnace support; mounting the upper fixture and the lower fixture respectively at the bottom end of the pull-up pressure rod and the top end of the pull-down pressure rod; connecting the bottom end of the pull-up pressure rod and the top end of the pull-down pressure rod respectively with the top and bottom ends of the high-temperature furnace in a sealed manner through the dynamic sealing device, and extending the bottom end of the pull-up pressure rod and the top end of the pull-down pressure rod into the high-temperature furnace to form a sealed environment in the furnace, the upper fixture and the lower fixture being located in the high-temperature furnace; mounting the circulation water cooling device to the wall of the high-temperature furnace; mounting the ray source window and the detection window that face each other on two opposite side walls of the high-temperature furnace respectively; mounting the ray source and the detector on the first movable device and the second movable device respectively to face the incident window and the transmission window respectively; providing the temperature sensor inside the high-temperature furnace, which is connected to the console located outside the high-temperature furnace through a data cable; providing the rotating motor on the tensile testing machine; and connecting the ray source, the detector, the temperature sensor, the rotating motor, the first movable device and the second movable device to the console respectively;

2) fixing the top and bottom ends of the specimen in the upper and lower fixtures respectively, such that the specimen is mounted inside the high-temperature furnace, and adjusting the size of the heating area by controlling the distance between the radiant heating source and the specimen;

3) adjusting a position of the high-temperature furnace support in the vertical direction such that the middle of the specimen is located in a central position of the high-temperature furnace, and then fixing the high-temperature furnace support; adjusting positions of the ray source and the detector, such that the ray source and the detector are on the same horizontal line as the central position of the high-temperature furnace to ensure that the X-ray exactly passes through the incident window and the transmission window of the high-temperature furnace, thus achieving a high transmittance;

4) controlling, by the console, the tensile testing machine to apply a pre-tightening or pre-compression force to the specimen through the pull-up pressure rod and the pull-down pressure rod to stabilize the specimen;

5) vacuum pumping, by the vacuum pump, the high-temperature furnace via the vacuum tube that is provided at the front sealing cover plate and connected into the high-temperature furnace, or directly injecting a specified gas into the high temperature furnace via the vacuum tube;

6) injecting, by the circulation water cooling device, circulation cooling water into the high-temperature furnace to ensure that the ray source and the detector around operates at room temperature;

7) controlling, by the console, the high-temperature furnace to heat the specimen;

8) acquiring, by the temperature sensor, the temperature of the specimen, and transmitting the temperature to the console for real-time feedback;

9) controlling, by the console, the tensile testing machine to apply a tensile or compressive load to the specimen by the pull-up pressure rod and the pull-down pressure rod after the temperature is stabilized; driving, by the rotating motor, the pull-up platform, the pull-down platform, the pull-up pressure rod, the pull-down pressure rod and the specimen to rotate synchronously; allowing, by the dynamic sealing device, the pull-up pressure rod and the pull-down pressure rod to rotate circumferentially and move axially, while the high-temperature furnace is fixed without rotating and moving accordingly, and utilizing the tensile testing machine, which is independent, to achieve high-load loading;

10) emitting, by the ray source, an X-ray to irradiate on the specimen through the incident window; allowing the X-ray to pass through the specimen and to be received by the detector through the transmission window, wherein during imaging, the high-temperature furnace does not rotate such that the high-temperature furnace is flat in the imaging direction, thereby shortening an imaging distance and improving imaging quality;

11) acquiring, by the detector, projection data after receiving the transmitted X-ray, and transmitting the projection data to the console;

12) acquiring, by the console, the applied force, the temperature and an image signal until the specimen breaks;

13) turning off the ray source, the detector and the high-temperature furnace after the loading is finished, and taking out the broken specimen; and 14) reconstructing, by the console, the projection data to derive an internal structure of the specimen in the loading process, and analyzing and processing the internal structure to acquire information on internal deformation and damage of the specimen loaded in the high-temperature environment.

In step 5), the specified gas is inert gas, argon, helium, etc.

In step 6), the temperature of the ray source and the detector is kept at 20-40° C.

In step 7), the temperature of the specimen heated in the high-temperature furnace is 800-1,200° C.

The advantages obtained according to the present disclosure are set forth as follows.

In the present disclosure, innovations are made in respect of the method and device for testing the internal deformation and damage of materials under a high-temperature environment. A high-temperature in-situ loaded CT testing system is built based on a miniature laboratory X-ray source, and the in-situ measurement of the internal deformation and damage information of the specimen under tensile and compressive loads in a high-temperature environment can thus be achieved. By taking advantage of the miniaturization design of the high-temperature device, the accuracy of the damage test conducted by using the laboratory X-ray source is improved. The loading device and the heating device are separated to achieve high-load loading. The maximum heating temperature in the high-temperature furnace reaches 1,600° C., and a maximum load of 100 kN can be applied by the loading device. Tests and researches on the internal damage and failure behavior of the high-temperature materials can be conducted according to the present disclosure. The accuracy and economy of the material damage tests are improved. The present disclosure obtains the high feasibility, has the wide applicability, and is simple in operation.

DETAILED DESCRIPTION OF THE EMBODIMENTS

The present disclosure is further described below with reference to the specific embodiments and accompanying drawings.

Figure 1:
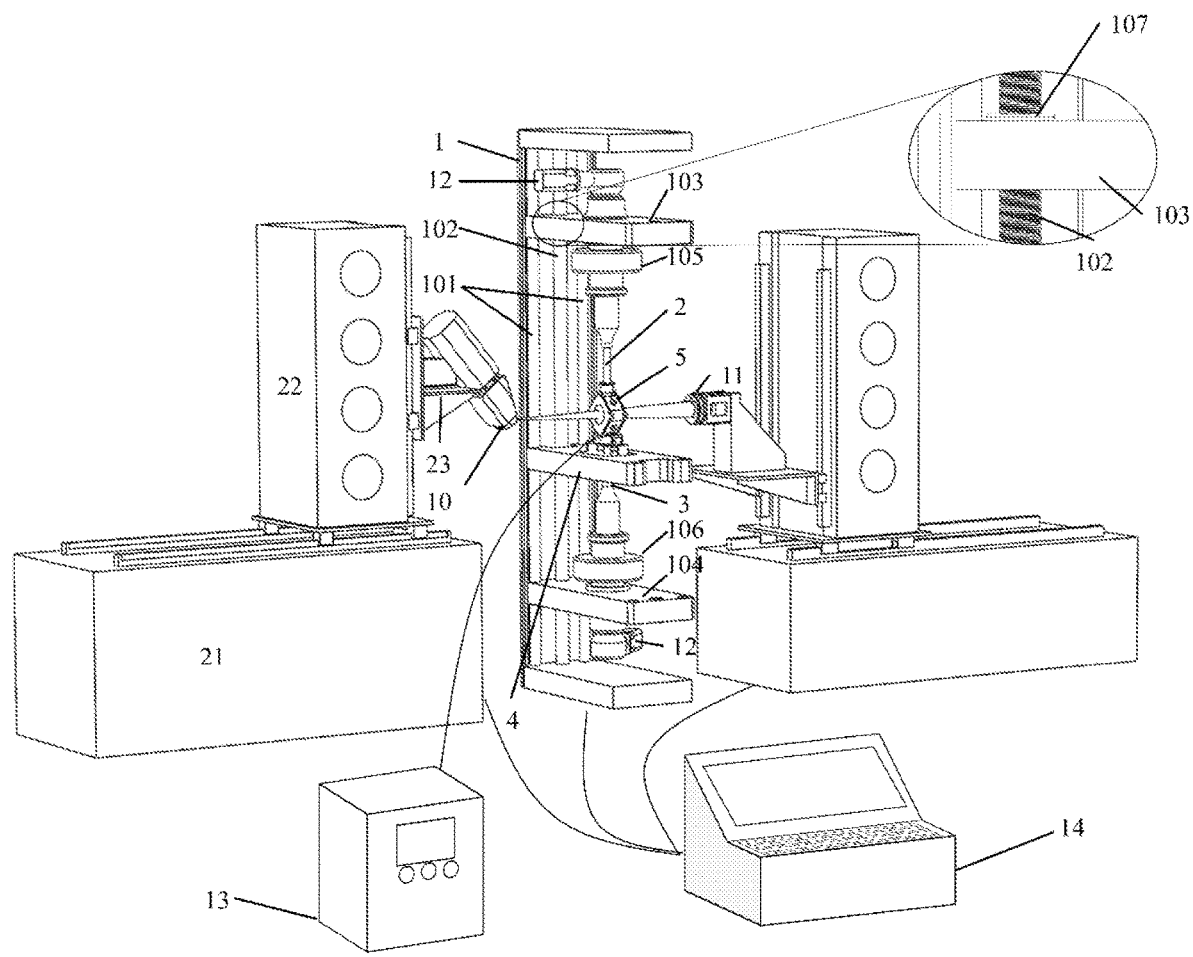
FIG. 1 is a schematic diagram of an embodiment of a high-temperature in-situ loaded computed tomography (CT) testing system based on a laboratory X-ray source according to the present disclosure.

As shown in FIG. 1, a high-temperature in-situ loaded computed tomography (CT) testing system based on a laboratory X-ray source according to an embodiment includes a tensile testing machine 1, a pull-up pressure rod 2, a pull-down pressure rod 3, a high-temperature furnace support 4, a high-temperature furnace 5, a circulation water cooling device 6, dynamic sealing devices 7, an upper fixture 8, a lower fixture 9, a ray source 10, a detector 11, a first movable device, a second movable device, a temperature sensor 15, a rotating motor 12, a temperature control panel 13 and a console 14. The tensile testing machine 1 comprises a standing post 101, a lead screw 102, an upper movable beam 103, a lower fixed beam 104, a transmission structure 107, a pull-up platform 105 and a pull-down platform 106; the standing post 101 and the lead screw 102 are disposed in a vertical direction; upper and lower ends of the standing post 101 are respectively connected with the upper movable beam 103 and the lower fixed beam 104 that are disposed in a horizontal direction; the upper movable beam 103 is connected with the lead screw 102 through the transmission structure 107, and moves up and down as the lead screw 102 rotates; the upper movable beam 103 and the lower fixed beam 104 are respectively provided thereon with the pull-up platform 105 and the pull-down platform 106 that are disposed in the horizontal direction. A furnace body of the high-temperature furnace 5 has a prism shape, and a central axis of the prism is flat along an imaging direction. A front sealing cover plate 51 and a rear sealing cover plate are respectively disposed in the front and rear of the furnace body along the imaging direction. A ray source window 52 and a detection window facing each other are respectively provided in the center of the front sealing cover plate and the rear sealing cover plate. The front sealing cover plate of the high-temperature furnace 5 is provided with a vacuum tube 53 that is communicated with the inside of the high-temperature furnace. The vacuum tube is connected with a vacuum pump to vacuum pump the high-temperature furnace, or alternatively, a specified gas is directly injected into the high-temperature furnace via the vacuum tube. Two through holes are respectively provided at top and bottom ends of the furnace body of the high-temperature furnace 5, and the dynamic sealing device 7 is provided in the through holes to form a sealed environment in the furnace. The dynamic sealing device 7 includes a sealing gland 71 and a sealing bushing 72. The sealing bushing 72, which is tubular, is snugly sleeved outside a pull-up pressure rod or a pull-down pressure rod; the sealing bushing 72 coaxially connects, in a sealed manner, a space between a top wall of the high-temperature furnace 5 and the pull-up pressure rod or between a bottom wall of the high-temperature furnace 5 and the pull-down pressure rod; the sealing gland 71, which is annular, is located at a top end or a bottom end of the sealing bushing 72 and seals an outer surface of the top or bottom wall of the high-temperature furnace 5. A plurality of radiant heating sources 54 that are symmetric with respect to the imaging direction are provided in the high-temperature furnace 5 to focus on a specimen to heat the specimen. A size of a heating area is adjusted by adjusting a distance between the radiant heating source and the specimen. A lower surface of the pull-up platform 105 and an upper surface of the pull-down platform 106 of the tensile testing machine 1 are respectively provided with the pull-up pressure rod 2 and the pull-down pressure rod 3 that are disposed coaxially in the vertical direction. The high-temperature furnace support 4 is attached to the standing post 101 of the tensile testing machine 1 and between the pull-up platform 105 and the pull-down platform 106. The high-temperature furnace 5 is fixedly mounted on the high-temperature furnace support 4. A bottom end of the pull-up pressure rod 2 and a top end of the pull-down pressure rod 3 are respectively connected with the top and bottom ends of the high-temperature furnace 5 in a sealed manner through the dynamic sealing device 7 of the high-temperature furnace 5 and extended into the high-temperature furnace 5 to form a sealed environment in the furnace. The dynamic sealing device 7 allows the pull-up pressure rod and the pull-down pressure rod 3 to rotate circumferentially and move axially, while the high-temperature furnace 5 is fixed without rotating and moving. The upper fixture 8 and the lower fixture 9 are respectively provided at the bottom end of the pull-up pressure rod 2 and the top end of the pull-down pressure rod 3 in the high-temperature furnace 5. The circulation water cooling device 6 is provided at a wall of the high-temperature furnace 5. The ray source 10 and the detector 11 are respectively attached to the first movable device and the second movable device, and face the ray source window and the detection window respectively. The temperature sensor 15 is provided in the high-temperature furnace 5, and the temperature sensor 15 is connected to the console located outside the high-temperature furnace 5 through a data cable. The rotating motor 12 is provided in the tensile testing machine 1 to be connected to the pull-up platform 105 and the pull-down platform 106. The ray source 10, the detector 11, the temperature sensor 15, the rotating motor 12, the first movable device and the second movable device are respectively connected to the console 14.

The first movable device and the second movable device each include a horizontal guide rail 21, a vertical guide rail 22 and a mounting bracket 23. The vertical guide rail is provided on the horizontal guide rail, and the mounting bracket is attached to the vertical guide rail. The ray source 10 and the detector 11 are fixed to the respective mounting brackets, and are moved horizontally and vertically by means of the first movable device and the second movable device respectively.

A high-temperature in-situ loaded CT testing method based on a laboratory X-ray source according to an embodiment includes the following steps.

Figure 2:
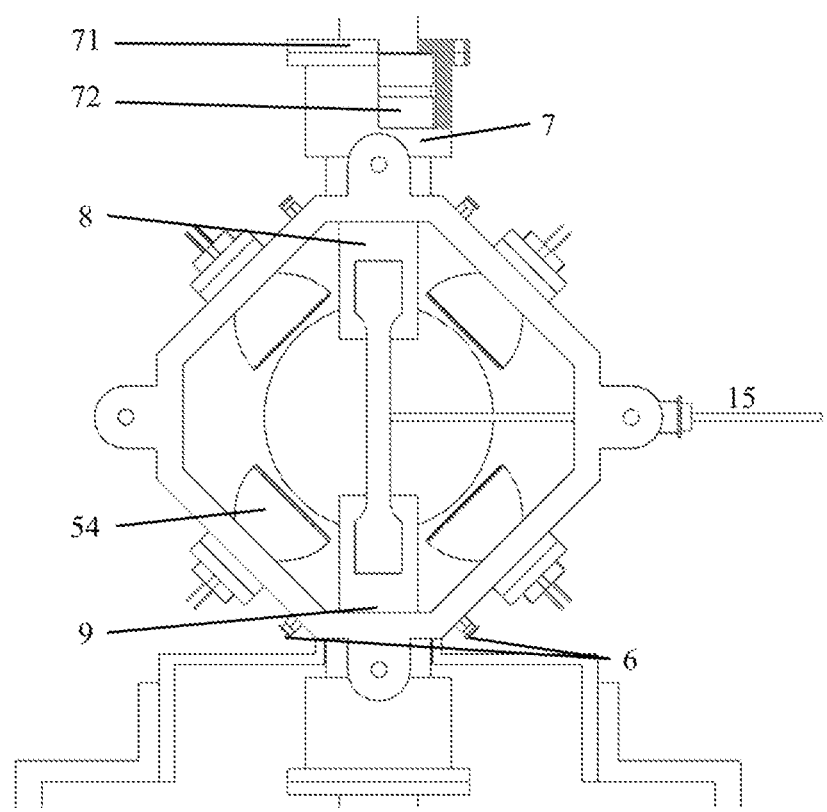
FIG. 2 is a sectional view of a high-temperature furnace in an embodiment of the high-temperature in-situ loaded CT testing system based on a laboratory X-ray source according to the present disclosure.
Figure 3:
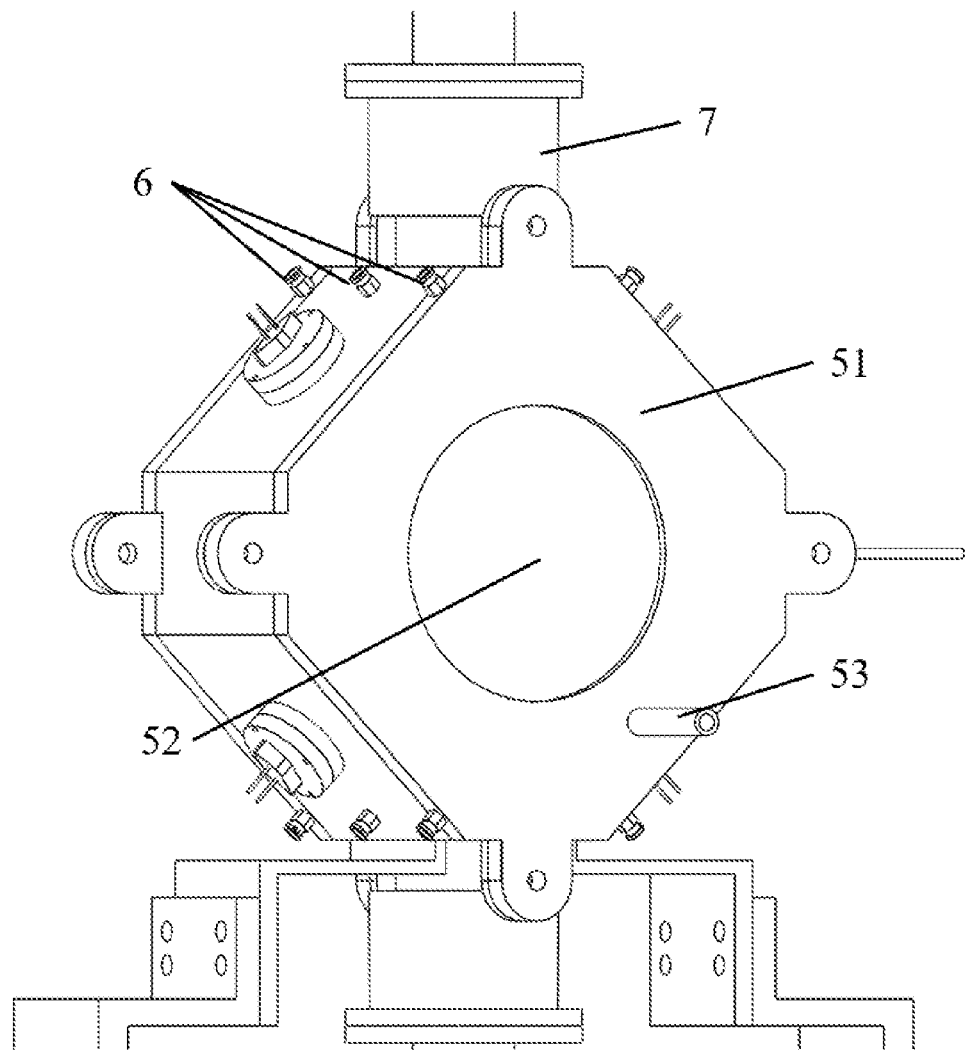
FIG. 3 is an external view of the high-temperature furnace in an embodiment of the high-temperature in-situ loaded CT testing system based on the laboratory X-ray source according to the present disclosure.

1) Constructing a device, as shown in FIGS. 1, 2 and 3.

A furnace body of a high-temperature furnace 5 is of a flat prism shape and has a size of 180 mm×180 mm×83 mm. The pull-up pressure rod 2 and the pull-down pressure rod 3 are coaxially mounted on the lower surface of the pull-up platform and the upper surface of the pull-down platform of the tensile test machine 1 in the vertical direction, respectively. The high-temperature furnace support 4 is disposed horizontally on the standing post of the tensile test machine 1 and between the pull-up platform and the pull-down platform. The high-temperature furnace 5 is fixedly mounted to the high-temperature furnace support 4. The upper fixture 8 and the lower fixture 9 are mounted respectively at the bottom end of the pull-up pressure rod 2 and the top end of the pull-down pressure rod 3. The bottom end of the pull-up pressure rod 2 and the top end of the pull-down pressure rod 3 are connected respectively to the top and bottom ends of the high-temperature furnace 5 in a sealed manner through the dynamic sealing device 7, and are extended into the high-temperature furnace 5. The upper fixture 8 and the lower fixture 9 are located in the high-temperature furnace 5, with the mounting holes therein facing each other. The circulation water cooling device 6 is arranged on the wall of the high-temperature furnace 5. The ray source window and the detection window facing each other are mounted on two opposite side walls of the high-temperature furnace 5. The ray source 10 and the detector 11 are mounted to the first movable device and the second movable device respectively to face the incident window and the transmission window, where an imaging distance between the detector and the ray source is 100 mm. The temperature sensor 15 is disposed in the high-temperature furnace 5, and is connected with the console located outside the high-temperature furnace 5 through a data cable. The rotating motor is provided in the tensile test machine 1. The ray source 10, the detector 11, the temperature sensor 15, the rotating motor, the first movable device and the second movable device are connected to the console respectively.

2) Opening a front sealing cover plate of the high-temperature furnace 5, and fixing the top and bottom ends of the specimen in the upper fixture 8 and the lower fixture 9 respectively, such that the specimen is mounted inside the high-temperature furnace 5.

3) Adjusting a position of the high-temperature furnace support 4 in the vertical direction such that the middle of the specimen is located in the central position of the high-temperature furnace 5, and then fixing the high-temperature furnace support 4; adjusting positions of the ray source 10 and the detector 11 such that the ray source 10 and the detector 11 are on the same horizontal line as the central position of the high-temperature furnace 5 to ensure the X-ray exactly passes through the ray source window and the transmission window of the high-temperature furnace 5, thus achieving a high transmittance.

4) Controlling, by the console, the tensile testing machine 1 to apply a pre-tightening or pre-compression force of about 20 N to the specimen through the pull-up pressure rod 2 and the pull-down pressure rod 3 to stabilize the specimen.

5) Vacuum pumping, by the vacuum pump, the high-temperature furnace via the vacuum tube that is provided at the front sealing cover plate and communicated with the high-temperature furnace, or directly injecting an inert gas into the high-temperature furnace.

6) Injecting, by the circulation water cooling device 6, circulation cooling water into the high-temperature furnace 5 to ensure that the ray source 10 and the detector 11 around operate at room temperature.

7) Turning on, by the console, a halogen lamp in the high-temperature furnace 5 to focus on the specimen to heat the specimen, where a heating power can be controlled through an external control panel connected with the halogen lamp.

8) Acquiring, by the temperature sensor 15, the temperature of the specimen, and transmitting the temperature to the console for real-time feedback.

9) Controlling, by the console, the tensile testing machine 1 to apply a load to the specimen after the temperature is stabilized at 1,000° C.; starting scanning; controlling, by the console, the tensile testing machine to apply a tensile or compressive load to the specimen through the pull-up pressure rod and the pull-down pressure rod; driving, by the rotating motor, the pull-up platform, the pull-down platform, the pull-up pressure rod, the pull-down pressure rod and the specimen to rotate synchronously, while the high-temperature furnace does not rotate, and the tensile testing machine, which is independent, is used to achieve high-load loading.

10) Emitting, by the ray source 10, an X-ray to irradiate the specimen through the ray source window; allowing the X-ray to pass through the specimen to be received by the detector 11 through the detection window, where during imaging, the high-temperature furnace does not rotate accordingly and the high-temperature furnace is flat in the imaging direction, which shortens an imaging distance and improves imaging quality.

11) Performing, by the detector 11, image processing on the received X-ray, and then transmitting an image signal to the console.

12) Acquiring, by the console, the applied force, the temperature and the image signal until the specimen breaks.

13) Turning off the ray source 10, the detector 11 and the high-temperature furnace 5 after the loading is finished, and taking out the broken specimen.

14) Analyzing the force, the temperature and the image signal to acquire the information on internal deformation and damage of the specimen loaded in the high-temperature environment.

Finally, it should be noted that disclosure of the embodiments is intended to help further understand the present disclosure. Those skilled in the art can understand that various substitutions and modifications may be made without departing from the spirit and scope of the present disclosure and the appended claims. Therefore, the present disclosure should not be limited to the content disclosed in the embodiments, and the scope of protection claimed by the present disclosure is subject to the scope defined by the claims.

What is claimed is:

1. A high-temperature in-situ loaded computed tomography (CT) testing system based on a laboratory X-ray source, wherein a tensile testing machine comprises a standing post, a lead screw, an upper movable beam, a lower fixed beam, a transmission structure, a pull-up platform and a pull-down platform; the standing post and the lead screw are disposed in a vertical direction; upper and lower ends of the standing post are respectively connected with the upper movable beam and the lower fixed beam that are disposed in a horizontal direction; the upper movable beam is connected with the lead screw through the transmission structure, and moves up and down as the lead screw rotates; the upper movable beam and the lower fixed beam are respectively provided thereon with the pull-up platform and the pull-down platform that are disposed in the horizontal direction; the high-temperature in-situ loaded CT testing system comprises the tensile testing machine, a pull-up pressure rod, a pull-down pressure rod, a high-temperature furnace support, a high-temperature furnace, a circulation water cooling device, dynamic sealing devices, an upper fixture, a lower fixture, an incident window, a transmission window, a ray source, a detector, a first movable device, a second movable device, a temperature sensor, a rotating motor, a temperature control panel and a console; wherein, a furnace body of the high-temperature furnace is flat along an imaging direction; a front sealing cover plate and a rear sealing cover plate that are parallel to each other and perpendicular to the imaging direction are respectively provided in the front and rear of the furnace body along the imaging direction; a ray source window and a detection window facing each other are provided in respective centers of the front sealing cover plate and the rear sealing cover plate; one end of a vacuum tube is communicated with inside of the high-temperature furnace through the front sealing cover plate of the high-temperature furnace, and another end of the vacuum tube is connected to a vacuum pump for vacuum pumping, or a specified gas is directly injected into the high-temperature furnace; two through holes are respectively provided at top and bottom ends of the furnace body of the high-temperature furnace, and the dynamic sealing devices are disposed in the through holes; a plurality of radiant heating sources that are symmetric with respect to the imaging direction are provided in the high-temperature furnace, and are connected to the temperature control panel located outside the high-temperature furnace; a lower surface of the pull-up platform and an upper surface of the pull-down platform of the tensile testing machine are respectively provided with the pull-up pressure rod and the pull-down pressure rod that are coaxially disposed in the vertical direction; the high-temperature furnace support is attached to the standing post of the tensile testing machine and between the pull-up platform and the pull-down platform; the high-temperature furnace is fixedly mounted on the high-temperature furnace support; a bottom end of the pull-up pressure rod and a top end of the pull-down pressure rod are respectively connected with the top and bottom ends of the high-temperature furnace in a sealed manner through the dynamic sealing devices and extended into the high-temperature furnace to form a sealed environment in the high-temperature furnace; the upper fixture and the lower fixture are respectively provided at the bottom end of the pull-up pressure rod and the top end of the pull-down pressure rod in the high-temperature furnace; the circulation water cooling device is provided at a wall of the high-temperature furnace; the ray source and the detector are respectively attached to the first movable device and the second movable device, and respectively face the ray source window and the detection window; the temperature sensor is provided in the high-temperature furnace, and is connected to the console located outside the high-temperature furnace through a data cable; the rotating motor is provided in the tensile testing machine to connect with the pull-up platform and the pull-down platform; the ray source, the detector, the temperature sensor, the rotating motor, the first movable device and the second movable device are respectively connected to the console; top and bottom ends of a specimen are respectively fixed in the upper fixture and the lower fixture, such that the specimen is fixed inside the high-temperature furnace; a size of a heating area is adjusted by controlling a distance between the radiant heating sources and the specimen; the plurality of radiant heating sources in the high-temperature furnace focus on the specimen to heat the specimen; the temperature sensor is used to acquire a temperature of the specimen, and the temperature is adjusted to a specified heating temperature through the external temperature control panel; after the temperature is stabilized, the console controls the tensile testing machine to apply a tensile or compressive load to the specimen through the pull-up pressure rod and the pull-down pressure rod; the rotating motor drives the pull-up platform, the pull-down platform, the pull-up pressure rod, the pull-down pressure rod and the specimen to rotate synchronously; the dynamic sealing devices allow the pull-up pressure rod and the pull-down pressure rod to rotate circumferentially and move axially, while the high-temperature furnace is fixed without rotating and moving; the tensile testing machine, which is independent, is used to achieve high-load loading; the ray source emits an X-ray to irradiate the specimen through the incident window; the X-ray passes through the specimen and is received by the detector through the transmission window; during imaging, the high-temperature furnace does not rotate such that the high-temperature furnace is flat in the imaging direction, which shortens an imaging distance and improves imaging quality; the detector acquires projection data from the received transmitted X-ray, and transmits the data to the console; the console reconstructs, analyzes and processes the projection data to acquire information on internal deformation and damage of the specimen loaded in the high-temperature environment.

2. The high-temperature in-situ loaded CT testing system according to claim 1, wherein the radiant heating sources each comprise a halogen bulb.

3. The high-temperature in-situ loaded CT testing system according to claim 1, wherein the circulation water cooling device comprises cooling water inlets, a cooling water chamber and a cooling water outlet; the cooling water inlets are provided at two side walls of a lower part of the high-temperature furnace; the cooling water chamber is provided at a side wall of the high-temperature furnace; the cooling water outlet is provided at a side wall of an upper part of the high-temperature furnace; double ends of the cooling water chamber are respectively connected with the cooling water inlets and the cooling water outlet; the cooling water inlet and the cooling water outlet are connected with an external circulation cooling water tank; the circulation cooling water tank injects circulation cooling water into the cooling water chamber through the cooling water inlets, and the circulation cooling water flows out from the cooling water outlet.

4. The high-temperature in-situ loaded CT testing system according to claim 1, wherein the dynamic sealing devices each comprise a sealing gland and a sealing bushing; the sealing bushing, which is tubular, is snugly sleeved outside the pull-up pressure rod or the pull-down pressure rod; the sealing bushing coaxially connects, in a sealed manner, a space between a top wall of the high-temperature furnace and the pull-up pressure rod or between a bottom wall of the high-temperature furnace and the pull-down pressure rod; the sealing gland, which is annular, is located at a top end or a bottom end of the sealing bushing and seals an outer surface of the top or bottom wall of the high-temperature furnace.

5. The high-temperature in-situ loaded CT testing system according to claim 1, wherein the first movable device and the second movable device each comprise a horizontal guide rail, a vertical guide rail and a mounting bracket; the vertical guide rail is provided on the horizontal guide rail; the mounting bracket is attached to the vertical guide rail; the ray source and the detector are fixed to the respective mounting bracket respectively, and are moved horizontally and vertically through the first movable device and the second movable device respectively.

6. The high-temperature in-situ loaded CT testing system according to claim 1, wherein opening holes acting as mounting holes are respectively provided at aligned positions at a bottom end of the upper fixture and a top end of the lower fixture.

7. The high-temperature in-situ loaded CT testing system according to claim 1, wherein the temperature sensor comprises a thermocouple.

8. The high-temperature in-situ loaded CT testing system according to claim 1, wherein the incident window and the transmission window are made of aluminum or glassy carbon.

9. A testing method for the high-temperature in-situ loaded computed tomography (CT) testing system according to claim 1, comprising the following steps:
1) constructing a device:
mounting the pull-up pressure rod and the pull-down pressure rod coaxially on the lower surface of the pull-up platform and the upper surface of the pull-down platform of the tensile testing machine in the vertical direction, respectively; providing the high-temperature furnace support horizontally on the standing post of the tensile testing machine and between the pull-up platform and the pull-down platform; fixedly mounting the high-temperature furnace on the high-temperature furnace support; mounting the upper fixture and the lower fixture respectively at the bottom end of the pull-up pressure rod and the top end of the pull-down pressure rod; connecting the bottom end of the pull-up pressure rod and the top end of the pull-down pressure rod respectively with the top and bottom ends of the high-temperature furnace in a sealed manner through the dynamic sealing devices, and extending the bottom end of the pull-up pressure rod and the top end of the pull-down pressure rod into the high-temperature furnace to form a sealed environment in the furnace, the upper fixture and the lower fixture being located in the high-temperature furnace; mounting the circulation water cooling device to the wall of the high-temperature furnace; mounting the ray source window and the detection window that face each other on two opposite side walls of the high-temperature furnace respectively; mounting the ray source and the detector on the first movable device and the second movable device respectively to face the incident window and the transmission window respectively; providing the temperature sensor inside the high-temperature furnace, which is connected to the console located outside the high-temperature furnace through the data cable; providing the rotating motor on the tensile testing machine; and connecting the ray source, the detector, the temperature sensor, the rotating motor, the first movable device and the second movable device to the console respectively;
2) fixing the top and bottom ends of the specimen in the upper and lower fixtures respectively, such that the specimen is mounted inside the high-temperature furnace, and adjusting the size of the heating area by controlling the distance between the radiant heating sources and the specimen;
3) adjusting a position of the high-temperature furnace support in the vertical direction such that a middle of the specimen is located in a central position of the high-temperature furnace, and then fixing the high-temperature furnace support; adjusting positions of the ray source and the detector, such that the ray source and the detector are on a same horizontal line as the central position of the high-temperature furnace to ensure that the X-ray exactly passes through the incident window and the transmission window of the high-temperature furnace, thus achieving a high transmittance;
4) controlling, by the console, the tensile testing machine to apply a pre-tightening or pre-compression force to the specimen through the pull-up pressure rod and the pull-down pressure rod to stabilize the specimen;
5) vacuum pumping, by the vacuum pump, the high-temperature furnace via the vacuum tube that is provided at the front sealing cover plate and connected into the high-temperature furnace, or directly injecting a specified gas into the high temperature furnace via the vacuum tube;
6) injecting, by the circulation water cooling device, circulation cooling water into the high-temperature furnace to ensure that the ray source and the detector around operates at room temperature;
7) controlling, by the console, the high-temperature furnace to heat the specimen;
8) acquiring, by the temperature sensor, the temperature of the specimen, and transmitting the temperature to the console for real-time feedback;
9) controlling, by the console, the tensile testing machine to apply a tensile or compressive load to the specimen by the pull-up pressure rod and the pull-down pressure rod after the temperature is stabilized; driving, by the rotating motor, the pull-up platform, the pull-down platform, the pull-up pressure rod, the pull-down pressure rod and the specimen to rotate synchronously; allowing, by the dynamic sealing devices, the pull-up pressure rod and the pull-down pressure rod to rotate circumferentially and move axially, while the high-temperature furnace is fixed without rotating and moving accordingly, and utilizing the tensile testing machine, which is independent, to achieve high-load loading;

10) emitting, by the ray source, an X-ray to irradiate on the specimen through the incident window; allowing the X-ray to pass through the specimen and to be received by the detector through the transmission window, wherein during imaging, the high-temperature furnace does not rotate such that the high-temperature furnace is flat in the imaging direction, thereby shortening an imaging distance and improving imaging quality;

11) acquiring, by the detector, projection data after receiving the transmitted X-ray, and transmitting the projection data to the console;

12) acquiring, by the console, an applied force, the temperature and an image signal until the specimen breaks;

13) turning off the ray source, the detector and the high-temperature furnace after the loading is finished, and taking out the broken specimen; and 14) reconstructing, by the console, the projection data to derive an internal structure of the specimen in the loading process, and analyzing and processing the internal structure to acquire information on internal deformation and damage of the specimen loaded in the high-temperature environment.

* * * * *